United States Patent [19]

Gardner

[11] Patent Number: 4,532,297
[45] Date of Patent: Jul. 30, 1985

[54] LOW VISCOSITY CURABLE POLYESTER RESIN COMPOSITIONS AND A PROCESS FOR THE PRODUCTION THEREOF

[75] Inventor: Hugh C. Gardner, Somerville, N.J.

[73] Assignee: Union Carbide Corporation, Danbury, Conn.

[21] Appl. No.: 626,146

[22] Filed: Jun. 29, 1984

[51] Int. Cl.³ .................... C08G 63/76; C08L 67/00
[52] U.S. Cl. ........................ 525/48; 525/20; 525/23; 525/43; 525/49; 528/274; 528/295.3; 528/306; 528/485; 528/487; 528/488; 528/492; 528/298
[58] Field of Search .............. 525/20, 23, 43, 48, 525/49; 528/274, 295.3, 306, 298, 485, 487, 488, 492

[56] References Cited

U.S. PATENT DOCUMENTS

| | | | |
|---|---|---|---|
| 29,555 | 2/1978 | Canning et al. | 260/22 CB |
| 2,671,070 | 3/1954 | Knapp | 260/45.4 |
| 3,166,434 | 1/1965 | Gauger, Jr. | 117/57 |
| 3,188,303 | 6/1965 | Dissen | 260/78.4 |
| 3,340,327 | 9/1967 | Spellberg et al. | 260/861 |
| 3,883,612 | 5/1975 | Pratt et al. | 260/862 |
| 3,933,757 | 1/1976 | Pratt et al. | 260/75 A |
| 3,957,736 | 5/1976 | Tsuchiya et al. | 526/11.1 |
| 3,986,992 | 10/1976 | Canning et al. | 260/22 CB |
| 4,029,848 | 6/1977 | Nelson | 428/430 |
| 4,035,439 | 7/1977 | Stevenson | 260/859 R |
| 4,100,120 | 7/1978 | Maekawa et al. | 260/22 CB |
| 4,148,765 | 4/1979 | Nelson | 260/22 CB |
| 4,224,430 | 9/1980 | Maekawa et al. | 526/282 |
| 4,228,251 | 10/1980 | Maekawa et al. | 525/49 X |
| 4,233,413 | 11/1980 | Monma et al. | 525/168 |
| 4,233,432 | 11/1980 | Curtis, Jr. | 528/298 |
| 4,246,367 | 1/1981 | Curtis | 525/49 |
| 4,299,950 | 11/1981 | Iwata et al. | 528/306 |
| 4,309,519 | 1/1982 | Obara et al. | 528/306 X |
| 4,348,499 | 9/1982 | Nelson | 525/49 |
| 4,360,634 | 11/1982 | Nelson | 525/36 |
| 4,435,530 | 3/1984 | Hefner | 525/48 X |

OTHER PUBLICATIONS

D. L. Nelson, Considerations: Dicyclopentadiene in Polyester Resins, 36th Annual Conference, Reinforced Plastics/Composites Institute, The Society of the Plastics Industry, Inc., Feb. 16-20, 1981, Session 7-E, pp. 1-7.

Primary Examiner—Lucille M. Phynes
Attorney, Agent, or Firm—Steven T. Trinker

[57] ABSTRACT

This invention relates to low viscosity curable polyester resin compositions and a process for the preparation thereof, which compositions contain a mixture of (i) an unsaturated ester terminally modified with a reactive olefin such as dicyclopentadiene or other Diels-Alder adducts of cyclopentadiene with an olefinic or acetylenic hydrocarbon or alkylated derivative thereof and (ii) a polymerizable ethylenically unsaturated monomer which serves to crosslink the unsaturated ester to a thermoset product. Fiber reinforced thermoset articles can be produced from these low viscosity curable polyester resin compositions.

18 Claims, 1 Drawing Figure

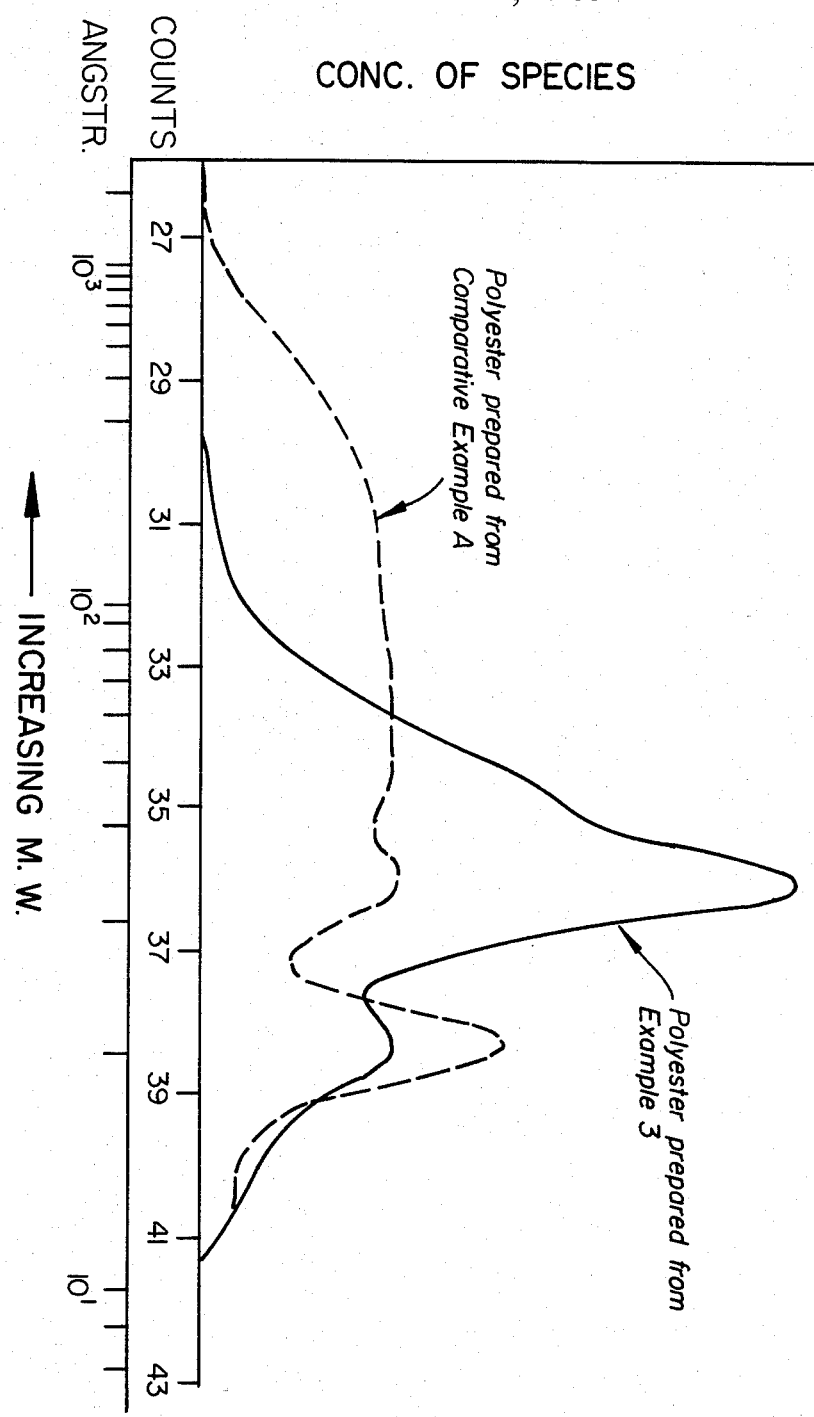

LOW VISCOSITY CURABLE POLYESTER RESIN COMPOSITIONS AND A PROCESS FOR THE PRODUCTION THEREOF

BRIEF SUMMARY OF THE INVENTION

Technical Field

This invention relates to low viscosity curable polyester resin compositions and a process for the preparation thereof, which compositions contain a mixture of (i) an unsaturated ester terminally modified with a reactive olefin such as dicyclopentadiene or other Diels-Alder adducts of cyclopentadiene with an olefinic or acetylenic hydrocarbon or alkylated derivative thereof and (ii) a copolymerizable ethylenically unsaturated monomer which serves to crosslink the unsaturated ester to a thermoset product. Fiber reinforced thermoset resin articles can be produced from these low viscosity curable polyester resin compositions.

Background of the Invention

Unsaturated polyester resins are typically used as the resin component in the manufacture of fiber reinforced thermoset plastics. The resins generally consist of unsaturated polyesters dissolved in a polymerizable ethylenically unsaturated monomer such as styrene. Typically, these unsaturated polyesters are formed by reacting an unsaturated diacid or anhydride with a nearly equivalent amount of dihydric alcohol at temperatures above about 200° C. for several hours. Maleic anhydride is the most common acid component utilized. The dihydric alcohols which are commonly used include ethylene glycol, 1,2-propylene glycol, dipropylene glycol, diethylene glycol, and the like. Modifying amounts of other diacids, such as phthalic acid, isophthalic acid, terephthalic acid, or adipic acid are also commonly employed. Phthalic anhydride is also often used. Unsaturation which is provided by maleate or fumarate groups within the backbone of the polyester takes part in the crosslinking, or curing, of unsaturated polyester resins. These unsaturated polyester resins are considered among the least expensive resins suitable for the manufacture of a variety of fiber reinforced products.

Much effort has recently been directed toward the development of alternative resin systems with potentially improved economics. To be a viable alternative, such resin systems should exhibit the highly desirable properties of conventional unsaturated polyester resins and provide fiber reinforced thermoset articles having excellent mechanical properties. Modification of unsaturated polyesters with olefins such as dicyclopentadiene has been investigated as one method for reducing the cost of unsaturated polyester resin systems.

Investigators have found that incorporation of dicyclopentadiene results in two structurally different types of polyesters. See, for example, D. L. Nelson, Considerations: Dicyclopentadiene in Polyester Resins, 36th Annual Conference, Reinforced Plastics/Composites Institute, The Society of the Plastics Industry, Inc., Feb. 16–20, 1981, Session 7-E, pages 1–7. One polyester type contains ester and/or ether groups resulting from carboxyl or hydroxyl addition to one of the dicyclopentadiene double bonds. Such ester and/or ether addition groups have the formula

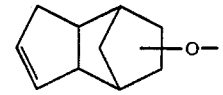

The other polyester type contains Diels-Alder reaction groups resulting from dimer cracking and subsequent reaction of cyclopentadiene with a dieneophile such as maleic acid. Such Diels-Alder groups have the formula

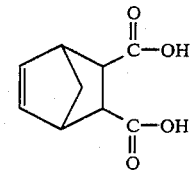

when maleic acid is the dieneophile. Combinations of the above groups may also be incorporated in polyesters.

U.S. Pat. Nos. 3,883,612, 3,933,757, 3,986,992, 4,035,439 and Re. 29,555, all assigned to SCM Corporation, disclose thickened, low shrink molding compositions containing a dicyclopentadiene-modified polyester polymer obtained by the following steps: (1) reacting a glycol, e.g., propylene glycol, and an unsaturated dibasic acid, e.g., maleic acid, at a temperature of about 150° C. to yield an acid terminated partial copolymer; (2) reacting dicyclopentadiene with the partial copolymer prepared in step (1) at a temperature of about 150° C. to yield a prepolymer; (3) reacting additional glycol with the prepolymer of (2) at a temperature of about 200° C. to yield a dicyclopentadiene polyester polymer; and (4) adding styrene to the dicyclopentadiene polyester polymer. Sheet molding compounds (SMC) and bulk molding compounds (BMC) were prepared from certain of the molding compositions.

U.S. Pat. Nos. 4,233,432 and 4,246,367, both assigned to United States Steel Corporation, disclose dicyclopentadiene modified polyester resins and a method for preparation thereof. The resins are prepared by reacting maleic anhydride and water with dicyclopentadiene at a temperature of about 90° C. to 150° C. to give a maleic half ester of dicyclopentyl alcohol, and thereafter reacting a glycol. e.g., propylene glycol, at a temperature of about 210° C. to form the resultant unsaturated polyester.

U.S. Pat. No. 4,233,413, assigned to Hitachi Chemical Company, Ltd., discloses low shrink resin compositions containing an unsaturated polyester obtained by reacting dicyclopentadiene with an alpha, beta-unsaturated dibasic acid, e.g., maleic acid, or reacting dicyclopentadiene with an alpha, beta-unsaturated dibasic acid anhydride, e.g., maleic anhydride and water at 150° C. or lower to yield a partially esterfied dicyclopentadiene carboxylic acid, which is further reacted with at least one polyhydric alcohol such as a glycol. e.g., propylene glycol, at a temperature of from 150° C.–210° C. This patent discloses cast articles prepared from the resin compositions.

U.S. Pat. No. 4,224,430, assigned to Hitachi Chemical Company, Ltd., discloses high solids resin compositions containing one or more oligomers prepared by reacting dicyclopentadiene with an alpha, beta-unsaturated hydrocarbon, e.g., maleic acid or maleic anhydride, at a temperature of from 100° C.-140° C. to yield a monobasic acid, which is further reacted with a polyhydric alcohol, e.g., diethylene glycol, at a temperature of from 180°-220° C. Cast articles were prepared from the resin compositions.

U.S. Pat. Nos. 4,029,848 and 4,148,765, both assigned to Dow Chemical Company, disclose resin compositions containing an unsaturated polyester obtained by reacting (1) a glycol, e.g., propylene glycol, (2) an olefinically unsaturated dicarboxylic acid or anhydride, e.g., maleic anhydride, (3) a saturated dicarboxylic acid or anhydride, e.g., phthalic anhydride, and (4) dicyclopentadiene at a temperature of about 140° C. for a period of time and thereafter at a temperature of about 200° C. for an additional period of time. Glass laminates were prepared from certain of the resin compositions by a hand roller technique.

In the above prior art methods, dicyclopentadiene is generally initially reacted with an unsaturated diacid or anhydride and/or a dihydric alcohol at temperatures of from about 90° C. to about 150° C. to give partial polyesters containing primarily the dicyclopentadiene addition groups described above. When maleic acid or anhydride is employed in such methods, the resulting polyester contains predominantly the maleate isomer configuration at these low reaction temperatures. The polyesters are generally further reacted for additional periods of time at temperatures of from about 150° C. to about 220° C. with the addition of more unsaturated diacid or anhydride or dihydric alcohol. At these high reaction temperatures, polyesterification occurs. Isomerization of the maleate to fumarate configuration occurs simultaneously with polyesterification. The fumarate isomer configuration is preferred for desirable resin performance in the manufacture of thermoset articles, in particular, the rapid copolymerization of the polyester with styrene.

U.S. Pat. Nos. 3,166,434 and 3,340,327 disclose resin compositions containing an unsaturated polyester obtained by reacting (1) an unsaturated dicarboxylic acid containing a major molar proportion of fumaric acid, (2) a glycol containing a major molar proportion of polyoxyalkylene glycol and (3) dicyclopentadiene at a temperature up to about 215° C. in the absence of a catalyst (see Example 1 in both patents). Diels-Alder reaction products accompany this polyesterification reaction. Coatings were prepared from certain of the resin compositions.

At the high reaction temperatures utilized in the prior art processes, both reacted and unreacted dicyclopentadiene become increasingly susceptible to fragmentary side reactions. For example, the remaining double bond in reacted dicyclopentadiene becomes increasingly susceptible to esterification and etherification reactions. Also, any unreacted dicyclopentadiene can readily undergo dimer cracking at temperatures above about 150° C. and thereby provide for the formation of Diels-Alder groups which can be incorporated into the structure of the polyester.

As a result of high reaction temperatures, polyesters prepared according to the above prior art methods have a comparatively large polydispersity as determined by conventional analytical methods such as gel permeation chromatography. It would be highly desirable to prepare dicyclopentadiene modified polyesters by a process in which dicyclopentadiene could be selectively reacted with a polyester having fumarate isomer configuration at low reaction temperatures, and thereby effectively preserve the dicyclopentadiene from fragmentary side reactions as potentially occur at high reaction temperatures. The selective reactivity of dicyclopentadiene with a polyester having fumarate isomer configuration at low reaction temperatures can provide polyesters having comparatively narrow molecular weight distributions. Narrow molecular weight distributions are highly desirable for applications requiring low viscosity resin systems such as those used in injection molding and in high solids coatings.

It has been found as a result of this invention that dicyclopentadiene can be selectively reacted with a polyester having fumarate half ester configuration at low reaction temperatures by utilizing a non-oxidizing acid catalyst having a non-nucleophilic anion. Dicyclopentadiene need no longer be exposed to high reaction temperatures utilized in the prior art methods. The dicyclopentadiene modified polyesters of this invention contain predominantly terminal ester groups resulting from selective carboxyl addition to one of the dicyclopentadiene double bonds. The formation of Diels-Alder reaction products is selectively minimized by utilizing dicyclopentadiene at low reaction temperatures. The dicyclopentadiene modified polyesters have a well defined structure and narrow molecular weight distribution.

There appears to be no prior art directed to the addition of dicyclopentadiene at low reaction temperatures to polyesters containing predominantly fumarate half ester terminal groups.

The curable molding compositions of this invention exhibit highly desirable properties, e.g., low viscosity, rapid cure rate, excellent moisture resistance, good high temperature properties, and the like, and also provide fiber reinforced composites having excellent mechanical properties. These low viscosity resin systems are very suitable for use in reaction injection molding of fiber reinforced thermoset articles. The curable resin compositions can also have utility as coatings, sealants, adhesives and the like.

Disclosure of the Invention

This invention relates to a process for preparing curable polyester resin compositions, which process comprises:

(a) contacting maleic acid or anhydride with an organic polyol for a time and at a temperature sufficient to form a composition comprising a maleate ester having the formula:

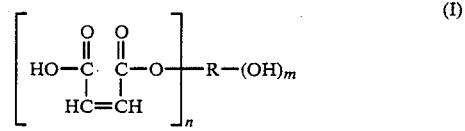
(I)

wherein n is a number having an average value of about 2 to less than about 4, m is a number equal to the free valence of R less the average value of n, the ratio of n to m is greater than about 2.0, preferably at least about 3.0, and R is the hydroxyl-free residue of an organic polyol which contained from 2 to 4 inclusive hydroxyl groups;

(b) heating the maleate ester of (a) in the presence of a catalyst for a time and at a temperature sufficient to form a composition comprising a fumarate ester having the formula:

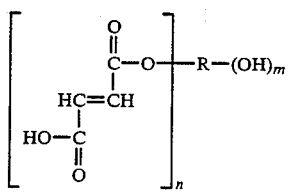

(II)

wherein n, m and R are as defined above;

(c) contacting a Diels-Alder adduct of cyclopentadiene with an olefinic or acetylenic hydrocarbon or alkylated derivative thereof with about stoichiometric amounts of carboxyl groups of the fumarate ester of (b) in the presence of a non-oxidizing acid catalyst having a non-nucleophilic anion for a time and at a temperature sufficient to form a composition comprising an unsaturated ester having the formula:

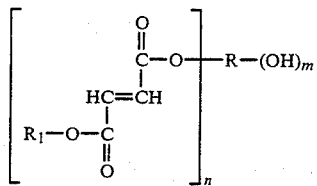

(III)

wherein n, m and R are as defined above and $R_1$ is the residuum of a Diels-Alder adduct of cyclopentadiene with an olefinic or acetylenic hydrocarbon or alkylated derivative thereof having from 2 to about 20 carbon atoms; and (d) admixing a copolymerizable ethylenically unsaturated monomer with the unsaturated ester of (c).

The unfilled curable resin compositions prepared by the process of this invention have a low viscosity, i.e., from about 10 to about 1500 centipoises, preferably less than about 1000 centipoises, and most preferably less than about 600 centipoises, so that they can be used to produce thermoset resin articles containing up to about 75 weight percent of reinforcing fibers by a rapid injection molding process. A low viscosity curable molding composition is highly desirable in a rapid injection molding process in order to avoid any movement of the reinforcing fibers during the injection step. The reinforcing fibers have a melting point or a glass transition temperature above about 130° C. and include, for example, fiberglass, carbon fibers, aromatic polyamide fibers, and mixtures thereof. Fiber reinforced thermoset resin articles can be produced from the curable molding compositions of this invention by a rapid injection molding process which is typically less than four minutes, oftentimes less than three minutes, from the time the cure of the resin mixture is initiated. Other composite fabrication processes such as spray up, wet lay up, resin transfer molding, centrifugal casting and filament winding can also utilize the resin compositions of this invention. The resin compositions can also be used in sheet molding compound (SMC) and bulk molding compound (BMC).

The curable polyester resin compositions prepared by the process of this invention are particularly suitable for the rapid fabrication of fiber reinforced thermoset articles. The fiber reinforced thermoset resin articles prepared from the curable molding compositions can have utility in many end-use applications such as automobile applications and the like.

The entire process of this invention is carried out at a temperature below 150° C. Dicyclopentadiene is therefore not exposed to high reaction temperatures. No volatile byproducts are formed during this process which is an economically attractive feature. Dicyclopentadiene modified polyesters prepared by the process of this invention have comparatively narrow molecular weight distributions determined by conventional analytical techniques such as gel permeation chromatography, and also have well defined structures. The dicyclopentadiene modified polyesters contain predominantly terminal ester groups resulting from selective addition of carboxyl groups to one of the dicyclopentadiene double bonds. The formation of Diels-Alder reaction products such as carbic anhydride or carbic acid is selectively minimized by utilizing dicyclopentadiene at low reaction temperatures.

DESCRIPTION OF THE DRAWING

FIG. 1 illustrates gel permeation chromatograms obtained from the dicyclopentadiene modified polyesters prepared in Example 3 and Comparative Example A hereinbelow. The gel permeation chromatograms show the effect of different processes on the molecular weight distribution of dicyclopentadiene modified polyesters prepared from the same proportions of an unsaturated anhydride, a glycol and a reactive olefin. FIG. 1 shows that the dicyclopentadiene modified polyesters of this invention as illustrated by Example 3 have a significantly narrower molecular weight distribution than comparative dicyclopentadiene modified polyesters of the prior art as illustrated by Comparative Example A.

The gel permeation chromatograms were recorded on a Waters Instruments Model 200 GPC containing five columns, and equipped with a refractive index detector. Each column was 4 feet in length and ⅜ inches in width and packed with crosslinked polystyrene. The columns had the following characteristics:

| Column No. | Porosity | Plates/Ft |
|---|---|---|
| 1 | $10^5$ | 700 |
| 2 | $10^4$ | 700 |
| 3 | $10^3$ | 700 |
| 4 | 250 | 450 |
| 5 | 60 | 450 |

The mobile phase was tetrahydrofuran.

DETAILED DESCRIPTION

The process for preparing the curable resin compositions which are suitable for use in the fabrication of fiber reinforced thermoset articles involves the following general steps:

(1) Preparation of a poly(maleate half ester) by reacting maleic acid or anhydride with an organic polyol;

(2) Isomerization of the maleate half ester groups to fumarate half ester groups;

(3) Addition of a non-oxidizing acid catalyst having a non-nucleophilic anion;

(4) Preparation of an unsaturated ester by selectively reacting a Diels-Alder adduct of cyclopentadiene with an olefinic or acetylenic hydrocarbon or alkylated derivative thereof such as dicyclopentadiene with the poly(fumarate half ester); and (5) Addition of an ethylenically unsaturated monomer such as styrene.

The entire process of this invention is carried out at a temperature below 150° C. Dicyclopentadiene is therefore not exposed to high reaction temperatures. No volatile byproducts are formed during this process which is an economically attractive feature.

The maleate half ester of the organic polyol prepared in step (1) can be characterized by the following empirical formula:

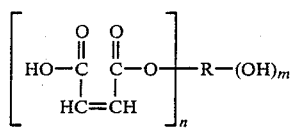
(I)

wherein n is a number having an average value of about 2 to less than about 4, m is a number equal to the free valence of R less the average value of n, the ratio of n to m is greater than about 2.0, preferably at least about 3.0, and R is the hydroxyl-free residue of an organic polyol which contained from 2 to 4 inclusive hydroxyl groups. If the organic polyol contains 4 hydroxyl groups, the reaction product can possess up to 4 half ester groups. If the number of half ester groups is less than the number of hydroxyl groups available from the organic polyol, the reaction product will contain residual hydroxyl groups. Typically, a hydroxyl:maleic acid or anhydride stoichiometry of from about 0.8 to about 1.1 is used in step (1), preferably a hydroxyl:maleic acid or anhydride stoichiometry of from about 0.9 to about 1.0. The maleate half esters prepared in step (1) have acid numbers ranging from 420 to 100 mg KOH per gram of maleate half ester.

The temperature utilized in step (1) can range from about 60° C. to about 120° C., preferably from about 70° C. to about 110° C. The reaction time for step (1) can vary from 0.5 hours or less to about 5 hours or longer. The only requirement is that the maleic acid or anhydride and the organic polyol react for a time and at a temperature sufficient to form the maleate half ester of the organic polyol.

The organic polyol which is reacted with maleic acid or anhydride to form the maleate half ester depicted by empirical formula (I) is typically a polyol which contains at least two carbon atoms and which may contain from 2 to 4, inclusive, hydroxyl groups. These polyols include alkane diols, triols, tetraols, aliphatic ether containing diols, triols, tetrols, cycloaliphatic containing diols, triols and tetraols, and aromatic containing diols, triols and tetraols, and the like. Specific illustrations of organic polyols suitable in the practice of this invention include the following: ethylene glycol, diethylene glycol, 2,2,4-trimethyl-1,3-pentanediol, dipropylene glycol, propylene glycol, polypropylene glycol having an average molecular weight of about 150 to about 600, triethylene glycol, 1,4-cyclohexane dimethanol, neopentyl glycol, 2,2-dimethyl-3-hydroxypropyl 2,2-dimethyl-3-hydroxypropionate, triethanolamine, 1,3-butanediol, tetraethylene glycol, 2,2-bis(4-hydroxyphenyl)propane and the ethylene and propylene oxide adducts of 2,2-bis(4-hydroxyphenyl)propane, pentaerythritol, erythritol, glycerine, trimethylol propane, 1,4-butanediol, 1,6-hexanediol, the polycaprolactone ester of a polyol in which from about 1 to about 5, preferably from about 1.5 to about 4.0 moles of caprolactone are esterified with a polyol, such as trimethylol propane or diethylene glycol, preferably the polycaprolactone ester of a polyol is the polycaprolactone ester of trimethylol propane in which about 1.5 moles of caprolactone are reacted with trimethylol propane or the polycaprolactone ester of trimethylol propane where about 3.6 moles of caprolactone are esterified with trimethylol propane, 2-ethyl-1,3,hexanediol, 1,5-pentanediol, tripropylene glycol, 2,2-bis(4-hydroxycyclohexyl)propane, 1,2,6-hexane triol, 1,3-propane diol, and the like. The most preferred organic polyols contain unhindered primary hydroxyl groups such as ethylene glycol, diethylene glycol, propylene glycol, trimethylolpropane, polycaprolactone esters of trimethylolpropane, 2,2-bis(4-hydroxyphenyl)propane and the ethylene and propylene oxide adducts of 2,2-bis(4-hydroxyphenyl)propane and the like.

Ethylene oxide and propylene oxide adducts of simple polyols and styrene/allyl alcohol copolymers such as RJ-101 commercially available from Monsanto Company, St. Louis, Mo., are also suitable organic polyols which can be reacted with maleic acid or anhydride to form the maleate half ester depicted by empirical formula (I).

Mixtures of the aforementioned organic polyols are also suitable for use in this invention.

The fumarate half ester of the organic polyol prepared in step (2) above can be characterized by the following empirical formula:

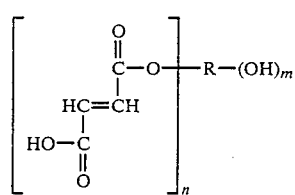
(II)

wherein n, m and R are as defined hereinabove. The isomerization of the maleate half ester groups to fumarate half ester groups can be effected in the presence of a catalyst and moderate heat. Typical catalysts which can be employed in the isomerization reaction include concentrated hydrochloric acid, aluminum chloride, phosphorous trichloride, aluminum tribromide, and the like. Other suitable isomerization catalysts are described in U.S. Pat. No. 3,391,183. Such catalysts are generally employed in an amount of from about 0.3 weight percent to about 2.0 weight percent, preferably from about 0.5 weight percent to about 1.2 weight percent, based on the total weight of the maleate half ester. The fumarate half esters prepared in step (2) have acid numbers ranging from 420 to 100 mg KOH per gram of fumarate half ester. Typically at least about 68 percent of the terminal groups are carboxylic acid groups.

The temperature utilized in the isomerization reaction of step (2) can range from about 80° C. to about 150° C., preferably from about 100° C. to about 130° C. The isomerization reaction time for step (2) can vary from about 0.5 hours or less to about 5 hours or longer. The only requirement is that the maleate half ester of the organic polyol be heated in the presence of a catalyst for a time and at a temperature sufficient to form the fumarate half ester of the organic polyol.

The catalyst added to the reaction mixture in step (3) above is a non-oxidizing acid catalyst having a non-nucleophilic anion. The non-oxidizing acid catalyst having a non-nucleophilic anion is essential for effecting the selective addition of the Diels-Alder adduct of cyclopentadiene with an olefinic or acetylenic hydrocarbon or alkylated derivative thereof, e.g., dicyclopentadiene, to the fumarate half esters prepared in step (2). A non-oxidizing acid catalyst having a non-nucleophilic anion is defined herein to mean that (1) a 10 percent by weight water solution has a pH of less than 1.0 and (2) the anion portion of the acid does not easily participate in a displacement reaction with organic halides.

Suitable non-oxidizing acid catalysts having a non-nucleophilic anion include fluoroboric acid, trifluoromethanesulfonic acid (triflic acid), hexafluorophosphoric acid, hexafluoroantimonic acid, and the like. Supported acid catalysts such as Nafion resins may also be used in this invention. The preferred non-oxidizing acid catalyst having a non-nucleophilic anion is fluoroboric acid. Such catalysts are generally employed in an amount of from about 0.01 weight percent to about 4.0 weight percent, preferably from about 0.05 weight percent to about 2.0 weight percent, based on the total weight of the fumarate half ester. These catalysts do not adversely affect cure of the curable polyester resin systems of this invention. Generally, none of the acid catalysts employed in the isomerization reaction of step (2) is suitable for catalyzing the addition of a Diels-Alder adduct of cyclopentadiene with an olefinic or acetylenic hydrocarbon or alkylated derivative thereof to the fumarate half ester in step (4).

Acid or acid acting catalytic materials such as sulfuric acid, zinc chloride or p-toluenesulfonic acid are not suitable for effecting the selective, rapid addition of dicyclopentadiene to the fumarate half esters prepared in step (2).

The unsaturated ester prepared in step (4) above can be characterized by the following empirical formula:

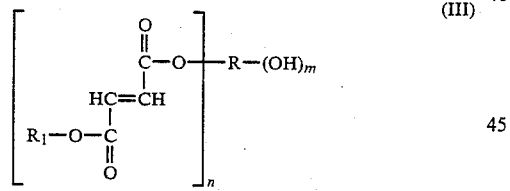

(III)

wherein n, m and R are as defined above and $R_1$ is the residuum of a Diels-Alder adduct of cyclopentadiene with an olefinic or acetylenic hydrocarbon or alkylated derivative thereof having from 2 to about 20 carbon atoms. Suitable olefinic hydrocarbons include ethylene, butadiene, cyclopentadiene, alkylated cyclopentadiene and the like. Suitable acetylenic hydrocarbons include acetylene, 1-hexyne, 2-butyne, 1-butyne, phenylacetylene and the like. $R_1$ is preferably derived from dicyclopentadiene. However, other Diels-Alder adducts of cyclopentadiene such as methyl dicyclopentadiene, norbornene and norbornadiene may also be used to selectively modify the fumarate half esters prepared in step (2).

The dicyclopentadiene useful in this invention is a commercial concentrate product generally prepared by dimerizing a crude $C_5$ stream derived from the cracking of crude mixtures of hydrocarbons as set forth in U.S. Pat. No. 3,557,239. Such commercial concentrate products include Dicyclopentadiene 97 commercially available from Exxon Chemical Company, Houston, Tex., and resin grade $C_{10}$ concentrate commercially available from Dow Chemical Company, Midland, Mich.

The commercial dicyclopentadiene concentrates generally contain from about 60 to about 97 percent by weight of dicyclopentadiene, about 5 to 30 weight percent of the mixed Diels-Alder dimers of diolefins such as butadiene, cyclopentadiene, isoprene, cis and trans piperylene and methyl cyclopentadiene. Any remaining amounts in these concentrates generally contain benzene, cyclopentene, 1,5-hexadiene and oligomers of the above diolefins.

The Diels-Alder adducts of cyclopentadiene and an olefinic or acetylenic hydrocarbon and alkylated derivatives thereof, e.g., dicyclopentadiene, can be incorporated into the fumarate half ester by two methods, i.e., via an addition reaction

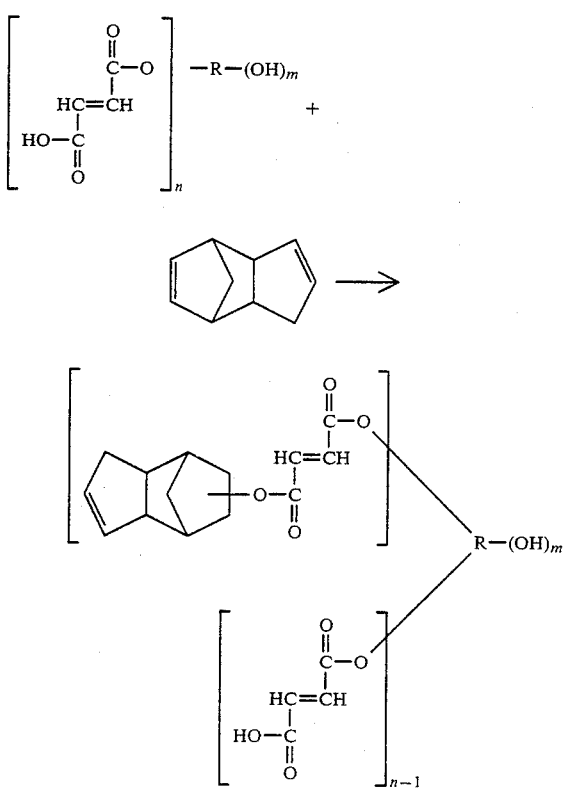

or by a Diels-Alder reaction

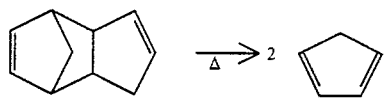

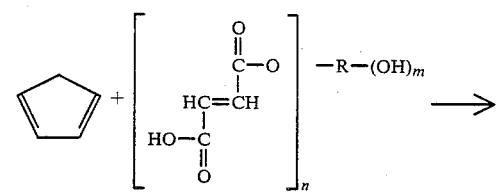

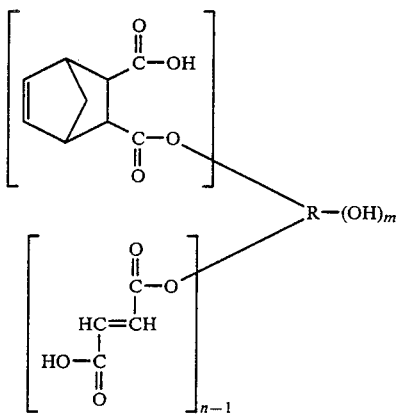

The Diels Alder reaction may also occur between the unsaturation in the polymer chain and cyclopentadiene. The properties of the resin compositions depend critically on how dicyclopentadiene is incorporated. In the process of this invention, conditions are tailored to favor the addition reaction. The formation of Diels-Alder reaction products such as carbic anhydride or carbic acid is selectively minimized by utilizing dicyclopentadiene at the low reaction temperatures employed in the process of this invention. For applications where fast cure is important such as in automotive applications, it is preferable to incorporate dicyclopentadiene via the addition mode. The addition mode is also preferred for improved compatibility of the polyester compositions with ethylenically unsaturated monomers such as styrene and for reduced moisture sensitivity in cured resins prepared therefrom.

The preferred stoichiometry is 0.7 to 1.2 moles of the Diels-Alder adduct of cyclopentadiene with an olefinic or acetylenic hydrocarbon or alkylated derivative thereof, e.g., dicyclopentadiene, per one mole of carboxylic group of the fumarate half ester. Since some of the dicyclopentadiene condenses with itself, molar ratios slightly above 1.0 can be employed without difficulty if desired.

The temperature utilized in the reaction of step (4) can range from about 80° C. to about 140° C., preferably from about 100° C. to about 125° C. The reaction time for step (4) can vary from about 0.1 hours or less to about 5 hours or longer. The only requirement is that the dicyclopentadiene react with the fumarate half ester of the organic polyol in the presence of the non-oxidizing acid catalyst having a non-nucleophilic anion for a time and at a temperature sufficient to form the unsaturated ester depicted in empirical formula (III) above. Since the addition of dicyclopentadiene to the carboxylic acid group of the fumarate half ester is an exothermic reaction, it is desirable to add the dicyclopentadiene at such a rate that the reaction temperature remains below about 130° C. An inert solvent may be employed for this step if desired. In the absence of the non-oxidizing acid catayst having a non-nucleophilic anion in step (3) above, mixtures of fumarate half esters and dicyclopentadiene are unreactive at a temperature of 120° C.

Suitable ethylenically unsaturated monomers which can be employed in step (5) above include one or more ethylenically unsaturated copolymerizable monomers which are soluble in and copolymerizable with the unsaturated ester prepared in step (4). Typically, the ethylenically unsaturated monomer is added to the reaction mixture after all of the olefinic compound, e.g., dicyclopentadiene, has reacted in step (4). These ethylenically unsaturated monomers contain at least a single $-CH=C<$ group, and preferably a $CH_2=C<$ group and include styrene and its derivatives and homologues, diallyl phthalate, triallyl isocyanurate, nonfunctionalized esters of acrylic or methacrylic acid (such as ethyl acrylate, butyl acrylate, and methyl methacrylate), unsaturated nitriles (such as acrylonitrile and methacrylonitrile) and the like. Also included herein are low levels of maleic anhydride.

Other suitable ethylenically unsaturated monomers include acrylic or methacrylic acid or a functionalized derivative thereof having a molecular weight of less than 300. Mixtures of these may also be used in this invention. The functionalized derivatives are characterized by the presence of acrylate, methacrylate, acrylamide, and methacrylamide groups and also by the presence of functional groups such as hydroxyl, amino, alkylamino, and epoxide, for example. The molecular weight of these monomers is typically less than 300. Preferred monomers are characterized by the following formula:

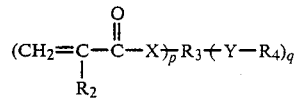

wherein $R_2$ is independently hydrogen or methyl; X and Y are independently $-O-$ or

wherein $R_5$ is hydrogen or lower alkyl; $R_3$ is an aliphatic or aromatic radical containing from 2 to about 10 carbon atoms, optionally containing $-O-$ or

$R_4$ is hydrogen or an aliphatic or aromatic radical containing from 1 to 10 carbon atoms; and p and q are integers of or greater than 1, preferably 1 to 3.

These functionalized derivatives of acrylic or methacrylic acid include 2-hydroxyethyl acrylate, 2-hydroxyethyl methacrylate, hydroxylpropyl acrylate, hydroxypropyl methacrylate, hydroxybutyl acrylate, hydroxybutyl methacrylate, 2-aminoethyl acrylate, 2-aminoethyl methacrylate, 2-methylaminoethyl acrylate, 2-methylaminoethyl methacrylate, 2-dimethylaminoethyl acrylate, 2-dimethylaminoethyl methacrylate, 2-hydroxyethyl acrylamide, 2-hydroxyethyl methacrylamide, 2-aminoethyl acrylamide, 2-aminoethyl methacrylamide, diethylene glycol monoacrylate, diethylene glycol monomethacrylate, 2-methoxyethyl acrylate, 2-methyoxyethyl methacrylate, pentaerythritol monoacrylate, pentaerythritol monomethacrylate, pentaerythritol diacrylate, pentaerythritol dimethacrylate, pentaerythritol triacrylate, glycerol monoacrylate, glycerol monomethacrylate, trimethylolpropane monoacrylate, trimethylolpropane monomethacrylate, glycidyl methacrylate, glycidyl acrylate, hydroxymethyl acrylamide and the like or mixtures thereof. It is understood that several isomers of many of these monomers exist and would be suitable for use herein either as individual components or as mixtures with any of the other monomers. Similarly, it is understood that additional derivatives containing aromatic rings and other alkyl groups in the acid or ester portion of the above formula may also be included.

Preferred functionalized derivatives of acrylic or methacrylic acid employed in the practice of this invention include 2-hydroxyethyl methacrylate, 2-hydroxyethyl acrylate, hydroxypropyl acrylate, and hydroxypropyl methacrylate.

Mixtures of the aforementioned ethylenically unsaturated monomers may be effectively employed in the practice of this invention.

The preferred ethylenically unsaturated monomer contemplated in the practice of this invention is styrene or a mixture of styrene and 2-hydroxyethyl methacrylate.

The ethylenically unsaturated monomer is present in the curable resin compositions in an amount of from about 10 to about 75 weight percent, preferably from about 25 to about 65 weight percent. The unsaturated ester prepared in step (4) is present in the curable resin compositions in an amount of from about 25 to about 90 weight percent, preferably from about 35 to about 75 weight percent.

Although the process for preparing the curable resin compositions produces no volatiles, a small amount of solid precipitate usually forms. This solid amounts to less than about 3 weight percent of the total resin composition weight, and consists primarily of fumaric acid which is a by-product of step (2). The solid can be removed by centrifugation or filtration.

The curable resin compositions may also be treated with a weak base prior to molding. Treatment with a weak base minimizes discoloration caused by high temperature during cure, especially when hexafluorophosphoric acid or trifluoromethanesulfonic acid (triflic acid) are used as catalysts for the addition of the Diels-Alder adduct of cyclopentadiene with an olefinic or acetylenic hydrocarbon or alkylated derivative thereof, e.g., dicyclopentadiene, to the fumarate half ester in step (4). Suitable weak bases include crosslinked polyvinylpyridine, disodium acid phosphate, sodium carbonate, alumina and the like. When using sodium carbonate in the weak base treatment step, a desiccant such as magnesium sulfate is also added to scavenge water generated in the neutralization process. The weak base can be employed in an amount of from about 0.1 weight percent to about 10.0 weight percent, preferably from about 0.2 weight percent to about 5.0 weight percent, based on the total weight of the resin composition. Preferably, the weak base is separated from the resin by, for example, filtration before the resin is molded.

It is furthermore desirable to utilize a vinyl polymerization inhibitor in those cases where the curable resin composition is to be stored and/or shipped. Suitable vinyl polymerization inhibitors are hydroquinone, parabenzoquinone, phenothiazine, t-butyl catechol, quinhydrone, toluhydroquinone, 4-nitrophenol, mono-t-butyl hydroquinone, 2,5-di-t-butylhydroquinone, hydroquinone monomethyl ether, the biphenol derivatives described in U.S. Pat. No. 4,158,027, and the like. The amount of inhibitor for the purpose of preventing vinyl polymerization can be that conventionally used, namely from about 100 to about 1000 ppm of the total weight of the curable resin composition.

A free radical initiator which initiates curing via the co-reaction of the unsaturated ester and the ethylenically unsaturated monomer can also be included in the curable resin compositions of this invention. These initiators include azo compounds, peroxides, peresters, perketals, and the like including mixtures thereof.

Azo and peroxide initiators are described by, for example, Gallagher et al. "Organic Peroxides Review, Plastics Design and Processing", July 1978, pages 38–42, and August 1978, pages 60–67 inclusive. The technology disclosed in those two articles is incorporated herein by reference. The choice of the specific peroxide or azo initiators or mixtures thereof for the purpose of curing the molding compositions of this invention is within the purview of those having skill in this art and the manner in which such peroxides and azo initiators effect a desirable cure is generally characterized in the aforementioned articles.

Examples of such initiators include 1,1-di-t-butyl-peroxycyclohexane, 1,1-di-t-butylperoxy-3,3,5-trimethylcyclohexane, 2,2-di-t-butylperoxybutane, 2,2-di-t-butyl-peroxy-4-methyl-pentane, 2,2-dicumylperoxypropane, butyl 2,2-di-t-butylperoxyvalerate, 2,2'-azobisisobutyronitrile, dibenzoyl peroxide, lauroyl peroxide, di-t-butyl peroxide, t-butyl-perpivalate, 2,5-dimethylhexane-2,5-diperethylhexanoate, t-butyl peroctoate, t-butyl perneodecanoate, t-butyl perbenzoate, t-butyl percrotonate, t-butyl perisobutyrate, di-t-butyl perphthalate, bis(4-t-butyl-cyclohexyl)peroxydicarbonate, methyl ethyl ketone peroxide, 2,4-pentanedione peroxide, 2-t-butylazo-2-cyano-4-methylpentane, ethyl 3,3-di(butylperoxy)butyrate, and the like.

The peresters and perketals may be used in combination with an acid cure accelerator as described in Netherlands published Patent Appllication No. 7604405. These acids include Bronsted acids with a $pK_a$ value lower than or equal to that of formic acid, such as hydrochloric acid, sulfuric acid, nitric acid, phosphoric acid, trichloroacetic acid, p-toluenesulfonic acid, and the like. Also, Lewis acids or metal halides with Lewis acid properties, such as boron triflouoride and the chlorides of iron, cobalt, zinc and aluminum, may be used.

Additionally, the above described initiators may be used in combination with other cure accelerators such as cobalt compounds. These cobalt compounds include cobalt naphthenate, cobalt-amine cure promoters (such as those designated as PEP 183-S and available from Air Products Incorporated), and the like. These cure accelerators operate by decomposing the curing catalyst at a temperature below their normal activation or decomposition temperature.

Mixtures of free radical initiators may be used advantageously herein, such as mixtures of peresters and/or perketals, of perketals and azo compounds, of peresters and azo compounds, or of an azo compound and a peroxide containing compound.

For coating compositions, a preferred initiator package includes methyl ethyl ketone peroxide and cobalt octoate.

Curing can also be effected by photopolymerization of coatings containing the resin compositions of this invention and a photoiniator. Curing occurs on exposure of such resin compositions to any source of radiation emitting actinic radiation at a wavelength within the ultraviolet and visible spectural regions. Suitable sources of radiation include mercury, xenon, carbon arc and tungsten filament lamps, sunlight, etc. Exposures may be from less than about 1 second to 10 minutes or more depending upon the amounts of particular polymerizable materials and photoinitiators being utilized and depending upon the radiation source and distance from the source and the thickness of the coating to be cured. The compositions may also be polymerized by exposure to electron beam irradiation. Generally speaking the dosage necessary is from less than 1 megarad to 100 megarad or more.

The concentration of the initiator or initiator mixture can be varied within wide limits. As a representative range, the concentration can vary from about 0.25 to about 3.0 weight percent, preferably from about 0.5 to about 2.5 weight percent, and most preferably, from about 0.60 to about 2.0 weight percent, based on the weight of the curable resin composition.

The curable resin compositions of this invention may also contain one or more of the known types of conventional additives, which are employed for their known purposes in the usual amounts. Illustrative of such additives are mold release agents or lubricants, pigments, fillers such as clay, hydrated alumina, silica, calcium carbonate and others known to the art, thermoplastic polymers, other thermosetting components such as epoxies, viscosity reducing agents, and the like. These additives can be dissolved or dispersed in the curable resin compositions to form a uniform mixture.

The fibers suitable for use in this invention as reinforcing agents have a melting point or a glass transition temperature above about 130° C. These fibers include fiberglass, carbon fibers, aromatic polyamide fibers (such as aramid fibers sold by E. I. duPont de Nemours Company, Wilmington, Del., under the trademark of Kevlar), metal fibers, such as aluminum and steel fibers, boron filters, and the like. The carbon fibers include those having a high Young's modulus of elasticity and high tensile strength. The carbon fibers may be produced from rayon, polyacrylonitrile or petroleum pitch. Preferred fiber lengths are 1 or more inches. Continuous filaments may also be used. It is also within the scope of this invention to include the use of fiber reinforcements of shorter lengths and also fillers such as milled glass.

The preferred fibers are fiberglass, carbon fibers, aromatic polyamide fibers, and mixtures thereof. The molded article contains from about 10 to about 75 weight percent, preferably from about 15 to about 65 weight percent of the reinforcing fiber.

The curable resin compositions of this invention are prepared by solution blending the unsaturated ester material, the ethylenically unsaturated monomer and any other optional ingredients such as a free-radical curing agent at ambient temperature. Insoluble additives such as calcium carbonate filler can be effectively dispersed in the curable molding compositions. This mixture constitutes the "resin portion" which is a term used herein.

The fiber reinforced molded articles of this invention be prepared by injecting the resin portion into a bed of one or more of the fibers. After the resin cures, the resulting composite possesses high stiffness and strength.

A preferred process for the rapid fabrication of a fiber reinforced molded article from the curable resin compositions of this invention is described in U.S. patent application Ser. No. 135,906 entitled "Molding Process and Apparatus Therefor," and filed on Apr. 14, 1980 in the name of R. Angell, Jr., which is incorporated herein by reference. In said process, the fiber reinforcement is comprises of one or more fibers with a melting point or a glass transition temperature above about 130° C. The process comprises the steps of (a) providing in a heatable matched metal die mold, a bonded web of one or more of said fibers, (b) providing in an accumulator zone, a liquid body of a thermosettable organic material which is curable upon heating to a thermoset resin composition, the viscosity of said liquid body being maintained essentially constant in the accumulator zone by keeping its temperature below that at which curing of said materials is substantial, (c) closing said mold containing said web, (d) injecting at least a portion of said thermosettable organic material under pressure from said accumulator zone into the mold to thereby fill the cavity in said mold, (e) initiating the curing of said materials by subjecting the materials to a temperature by heating the mold, which is above the temperature at which the curing of said materials is initiated, and (f) opening said mold and removing the cured thermoset article therefrom.

An important aspect of the present invention is that when the curable resin compositions are injected into the interior of the mold, the fibers are not displaced or at most, only slightly displaced from their original position. As a result, the positioning of the fiber reinforcement within the framework of the molded article can therefore be predetermined and maintained in the final molded product. This allows one to achieve a molded product having high and predictable mechanical properties. These properties are determined by the original fiber placement in the mold and are not affected by additional fiber movement when the resin system is injected.

In order to prevent or reduce fiber displacement (i.e., movement and/or orientation) during resin injection, the curable resin compositions of this invention should have a viscosity of from about 10 to about 1500 centipoise, preferably less than about 1000 centipoise, and most preferably less than about 600 centipoise. Curable resin compositions having viscosities higher than about 1500 centipoise generally cause substantial fiber movement in the resulting composites. Such composites having non-uniform fiber distribution exhibit poor mechanical properties.

A preferred apparatus for use in preparing fiber reinforced molded articles from curable resin compositions in accordance with this invention is also described in U.S. patent application Ser. No. 135,906, filed Apr. 14, 1980. The apparatus is described as comprising: (a) a heatable matched metal die mold containing one or more cavities therein with means for opening said mold to expose such cavities, and closing the same, and means for controlling the injection of a thermosettable organic liquid to such cavities when the mold is closed, (b) means associated with said mold, whereby one or more fibers in the form of an interlocked mass are provided in a portion of the cavities thereof when the mold is open to expose such cavities and prior to the injection of the thermosettable liquid to such cavities when the mold is closed, (c) accumulator means associated with said mold which can contain a thermosettable liquid transportable to means for controlling injection of said liquid to such cavities, and (d) cooling means associate with the means for controlling the injection of such liquid to such cavities, whereby the temperature of the liquid in such injection means is maintained substantially below the temperature of the mold.

Although this invention has been described with respect to a number of details, it is not intended that this invention should be limited thereby. The examples which follow are intended solely to illustrate the embodiments of this invention which to date have been determined and are not intended in any way to limit the scope and intent of this invention.

The resin compositions, non-reinforced castings and cured glass reinforced composites prepared in the examples hereinbelow were evaluated according to the following procedures:

Proton nuclear magnetic spectroscopy was used to determine the relative amounts of maleates, i.e., maleic acid, maleic anhydride, maleate half ester and maleate diester, and the amounts of fumarates, i.e., fumaric acid, fumarate half ester and fumarate diester, in the unsaturated ester in the resin compositions. In general, a sample was dissolved in $d_6$-dimethyl sulfoxide and the areas for the resonances from the vinylic protons, i.e., —CH=CH—, were compared against each other. The resonance for the vinylic protons in maleic anhydride appeared at approximately $\delta=7.4$ ppm relative to the protons in tetramethylsilane, the internal standard. Resonances for these protons in fumarates appeared at approximately $\delta=6.8$ ppm relative to the internal standard, and resonances for these protons in maleates, i.e., maleic acid, maleate half ester and maleate diester, appeared at approximately $\delta=6.25$ ppm.

Acid Number: A resin sample weighed to the nearest 0.01 gram was added to a flask containing 50 milliliters of a mixture of pyridine and methanol (1:1 volume ratio). The contents in the flask were titrated with 0.5N aqueous potassium hydroxide using phenolphthalein as an end point indicator. The acid number was calculated as follows:

$$\frac{(A)(N)(56.1)}{\text{grams sample}} = \text{Acid No. (mg KOH/gm sample)}$$

where A is the milliliters of potassium hydroxide titration solution required for the resin sample and N is the normality of the potassium hydroxide solution.

Viscosity: A resin sample was equilibrated at 25° C. and the viscosity was determined using a Brookfield model LVT viscometer.

SPI Gel Time: The cure characteristics of the resin compositions were monitored by the procedure described in A. L. Smith, 6th SPI, Chicago, Ill., 1951, Reinforced Plastics Div., Section 1, page 1.

Flexural Strength: ASTM D-790.
FLexural Modulus: ASTM D-790.
Heat Deflection Temperature: ASTM D-648.
Tensile Strength: ASTM D-638.
Tensile Modulus: ASTM D-638.
Elongation: ASTM D-638.
Glass content was determined by ashing.

Unless otherwise indicated, the examples hereinbelow utilized high purity dicyclopentadiene commercially available from Exxon Chemical Company, Houston, Tex. as Dicyclopentadiene 97.

Examples 1 through 4 describe the preparation of the resin compositions of this invention.

EXAMPLE 1

Into a 3 liter four-necked round bottom reaction flask equipped with a nitrogen inlet and outlet, paddle stirrer, electric heating mantle and thermometer was added 490 grams (5.0 moles) of molten maleic anhydride and 500 grams (1.67 moles) of TONE-0301. TONE-0301 is a polycaprolactone triol having an average molecular weight of 300 and an average hydroxyl number of 560, and is commercially available from Union Carbide Corporation, Danbury, Conn. The resulting reaction mixture was heated to a temperature of 80° C. with continuous stirring, and thereafter maintained at a temperature of from 80° C. to 116° C. for a period of 40 minutes. A nitrogen blanket was maintained throughout this reaction period. NMR spectroscopic analysis indicated that the reaction mixture consisted predominantly of the tris(maleate half ester) of TONE-0301.

Following the addition of 9 milliliters of concentrated hydrochloric acid into the reaction flask, the temperature of the reaction mixture was increased to 120° C. The reaction mixture was maintained at this temperature with continuous stirring for a period of 5 hours. A nitrogen blanket was maintained throughout this reaction period. NMR spectroscopic analysis indicated that the reaction mixture consisted predominantly of the tris(fumarate half ester) of TONE-0301 (approximately 93 percent of the maleate groups had isomerized to fumarate groups). The reaction mixture had an acid number of 286 mg KOH/gm in pyridine/methanol, indicating that the major fumarate species was the tris(fumarate half ester) of TONE-0301.

The reaction mixture was then cooled to a temperature of 115° C., after which 0.4 grams of methylhydroquinone and 2.5 milliliters of fluoroboric acid (a 48 weight percent solution in water) were added into the reaction flask. Thereafter, for a period of 50 minutes, 660 grams (5.0 moles) of dicyclopentadiene were slowly added into the reaction flask with continuous rapid stirring. Following the 50 minute reaction period, an additional one milliliter of fluoroboric acid (a 48 weight percent solution in water) was added into the reaction flask). The reaction mixture was then heated to a temperature of 120° C. and maintained at this temperature with continuous stirring for a period of 3.8 hours. The extent of the reaction between dicyclopentadiene and the tris(fumarate half ester) of TONE-0301 was monitored by titration for residual acid, and also by NMR spectroscopy.

Following the 3.8 hour heating period, 1100 grams of styrene containing 0.1 grams of methylhydroquinone were added into the reaction flask. The resulting mixture was cooled to ambient temperature and filtered to give a filtrate product and 33.0 grams (1.2 weight percent of the total reaction mixture) of a solid by-product. NMR spectroscopic analysis indicated that the solid by-product consisted primarily of fumaric acid. The filtrate product was a clear amber fluid with a viscosity of 68 centipoises at 22° C. and having an acid number of 6 mg KOH/gm in pyridine/methanol. The low acid number indicated that the filtrate product consisted predominantly of the dicyclopentadiene-modified tris(fumarate half ester) of TONE-0301. NMR spectroscopic analysis indicated that the product prior to styrene addition consisted predominantly of the dicyclopentadiene-modified tris(fumarate half ester) of TONE-0301.

EXAMPLE 2

Into a 3 liter four-necked round bottom reaction flask equipped with a nitrogen inlet and outlet, paddle stirrer, electric heating mantle and thermometer with Therm-O-Watch controller was added 981 grams (10.0 moles) of molten maleic anhydride. Thereafter, for a period of 90 minutes, 530 grams (5.0 moles) of diethylene glycol were added into the reaction flask with continuous stirring at a temperature of from 65° C. to 97° C. After the addition of diethylene glycol was complete, the resulting reaction mixture was maintained at a temperature of 81° C. for an additional 2.5 hours with continuous stirring. A nitrogen blanket was maintained throughout this reaction period. NMR spectroscopic analysis indicated that the reaction mixture consisted of the following distribution of maleic anhydride containing components: 92 percent of the bis(maleate half ester) of diethylene glycol, 4 percent of the mono(maleate half ester) of diethylene glycol and 4 percent of unreacted maleic anhydride.

To a 788 gram portion of the reaction mixture prepared above containing predominantly the bis(maleate half ester) of diethylene glycol was added 4.5 grams of anhydrous hydrochloric acid in 28.5 grams (0.19 moles) of triethylene glycol. An additional 37.1 grams (0.38 moles) of maleic anhydride was then added into the reaction flask. The resulting reaction mixture was heated to a temperature of 120° C., and maintained at this temperature for a period of 5 hours with continuous stirring. A nitrogen blanket was maintained throughout this reaction period. NMR spectroscopic analysis indicated that the reaction mixture consisted predominantly of the bis(fumarate half ester) of diethylene glycol (approximately 93 percent of the maleate groups had isomerized to fumarate groups). The reaction mixture had an acid number of 382 mg KOH/mg in pyridine/methanol, indicating that the major fumarate species was the bis(fumarate half ester) of diethylene glycol.

Into the reaction flask was then added 0.4 grams of methylhydroquinone and 2.5 milliliters of fluoroboric acid (a 48 weight percent solution in water). Thereafter, for a period of 80 minutes, 733 grams (5.54 moles) of dicyclopentadiene were added slowly into the reaction flask with continuous stirring at a temperature of from 102° C. to 126° C. The reaction mixture was then maintained at a temperature of 115° C. with a period of 2.2 hours with continuous stirring. The extent of the reaction between dicyclopentadiene and the bis(fumarate half ester) of diethylene glycol was monitored by titration for residual acid, and also by NMR spectroscopy.

Following the 2.2 hour heating period, 853 grams of styrene containing 0.45 grams of methylhydroquinone were added into the reaction flask. The resulting mixture was cooled to ambient temperature and filtered to give a filtrate product and a small amount of a solid by-product. NMR spectroscopic analysis indicated that the solid by-product consisted predominantly of fumaric acid. The filtrate product was a clear brown fluid with a viscosity of 42 centipoises at 25° C. and having an acid number of 19 mg KOH/gm in pyridine/methanol. The low acid number indicated that the filtrate product consisted predominantly of the dicyclopentadiene-modified bis(fumarate half ester) of diethylene glycol. NMR spectroscopic analysis indicated that the product prior to styrene addition consisted predominantly of the dicyclopentadiene-modified bis(fumarate half ester) of diethylene glycol.

EXAMPLE 3

Into a 3 liter four-necked round bottom reaction flask equipped with a nitrogen inlet and outlet, paddle stirrer, electric heating mantle and thermometer was added 980 grams (10.0 moles) of molten maleic anhydride. Thereafter, for a period of 80 minutes, 531 grams (5.0 moles) of diethylene glycol were added into the reaction flask with continuous stirring at a temperature of from 70° C. to 97° C. After the addition of diethylene glycol was complete, the resulting reaction mixture was maintained at a temperature of 80° C. for an additional 3 hours with continuous stirring. A nitrogen blanket was maintained throughout this reaction period. NMR spectroscopic analysis indicated that the reaction mixture consisted predominantly of the bis(maleate half ester) of diethylene glycol.

To a 1000 gram portion of the bis(maleate half ester) of diethylene glycol prepared above was added 5.0 grams of aluminum chloride. The resulting reaction mixture was then heated to a temperature of 120° C., and maintained at this temperature for a period of 3.5 hours with continuous stirring. A nitrogen blanket was maintained throughout this reaction period. NMR spectroscopic analysis indicated that the reaction mixture consisted predominantly of the bis(fumarate half ester) of diethylene glycol (approximately 94 percent of the maleate groups had isomerized to fumarate groups).

The reaction mixture was then cooled to a temperature of 115° C., after which 6 milliliters of fluoroboric acid (a 48 weight percent solution in water) were added into the reaction flask. Thereafter, for a period of 90 minutes, 831 grams (6.30 moles) of dicyclopentadiene were slowly added into the reaction flask with continuous stirring at a temperature of from 105° C. to 118° C. The reaction mixture was then heated to a temperature of 120° C. and maintained at this temperature with continuous stirring for a period of 70 minutes. The extent of the reaction between dicyclopentadiene and the bis(fumarate half ester) of diethylene glycol was monitored by titration for residual acid, and also by NMR spectroscopy.

Following the 70 minute heating period, 991 grams of styrene containing 0.56 grams of methylhydroquinone were added into the reaction flask. The resulting mixture was cooled to ambient temperature and centrifuged to give a supernatant liquid product and a small amount of a solid by-product. NMR spectroscopic analysis indicated that the solid by-product consisted predominantly of fumaric acid. The supernatant liquid product was a tan hazy fluid with a viscosity of 40 centipoises at 25° C. and having an acid number of 24 mg KOH/gm in pyridine/methanol. The low acid number indicated that the supernatant liquid product consisted predominantly of the dicyclopentadiene-modified bis(fumarate half ester) of diethylene glycol. NMR spectroscopic analysis indicated that the product prior to styrene addition consisted predominantly of the dicyclopentadiene-modified bis-(fumarate half ester) of diethylene glycol.

EXAMPLE 4

Into a 3 liter four-necked round bottom reaction flask equipped with a nitrogen inlet and outlet, paddle stirrer, electric heating mantle and thermometer was added 980 grams (10.0 moles) of molten maleic anhydride. Thereafter, for a period of 80 minutes, 531 grams (5.0 moles) of diethylene glycol were added into the reaction flask with continuous stirring at a temperature of from 70° C. to 97° C. After the addition of diethylene glycol was complete, the resulting reaction mixture was maintained at a temperature of 80° C. for an additional 3 hours with continuous stirring. A nitrogen blanket was maintained throughout this reaction period. NMR spectroscopic analysis indicated that the reaction mixture consisted predominantly of the bis(maleate half ester) of diethylene glycol.

To a 200 gram portion of the bis(maleate half ester) of diethylene glycol prepared above was added 2.0 milliliters of concentrated hydrochloric acid at a temperature of 100° C. The resulting reaction mixture was then heated to a temperature of 120° C., and maintained at this temperature for a period of 4.6 hours with continuous stirring. A nitrogen blanket was maintained throughout this reaction period. NMR spectroscopic analysis indicated that the reaction mixture consisted predominantly of the bis(fumurate half ester) of diethylene glycol (approximately 86 percent of the maleate groups had isomerized to fumarate groups).

The reaction mixture was then cooled to a temperature of 115° C., after which 2 milliliters of hexafluorophosphoric acid (a 60 weight percent solution in water) were added into the reaction flask. Thereafter, for a period of 25 minutes, 166 grams (1.26 moles) of dicyclopentadiene were slowly added into the reaction flask with continuous stirring at a temperature of from 120° C. to 125° C. The reaction mixture was then heated to a temperature of 122° C. and maintained at this temperature with continuous stirring for a period of 3.2 hours. The extent of the reaction between dicyclopentadiene and the bis-(fumarate half ester) of diethylene glycol was monitored by titration for residual acid, and also by NMR spectroscopy.

Following the 3.2 hour heating period, 291 grams of styrene containing 0.13 grams of methylhydroquinone were added into the reaction flask. The resulting mixture was cooled to ambient temperature and filtered to give a filtrate product and a small amount of a solid by-product. NMR spectroscopic analysis indicated that the solid by-product consisted predominantly of fumaric acid. The filtrate product was a clear brown fluid with a viscosity of 15 centipoises at 25° C. and having an acid number of 21 mg KOH/gm in pyridine/methanol. The low acid number indicated that the filtrate product consisted predominantly of the dicyclopentadiene-modified bis(fumarate half ester) of diethylene glycol. NMR spectroscopic analysis indicated that the product prior to styrene addition consisted predominantly of the dicyclopentadiene-modified bis(fumarate half ester) of diethylene glycol.

Examples 5 through 8 show the effect of choice of catalyst and temperature on the rate of isomerization of maleate half ester groups to fumarate half ester groups.

EXAMPLES 5 THROUGH 8

Into a 3 liter four-necked round bottom reaction flask equipped with a nitrogen inlet and outlet, paddle stirrer, electric heating mantle and thermometer was added 98 grams (1.0 mole) of molten maleic anhydride. Thereafter, for a period of 80 minutes, 53 grams (0.5 moles) of diethylene glycol were added into the reaction flask with continuous stirring at a temperature of from 70° C. to 97° C. After the addition of diethylene glycol was complete, the resulting reaction mixture was maintained at a temperature of 110° C. for an additional one hour with continuous stirring. A nitrogen blanket was maintained throughout this reaction period. NMR spectroscopic analysis indicated that the reaction mixture consisted predominantly of the bis(maleate half ester) of diethylene glycol. The reaction mixture was allowed to cool to ambient temperature.

To a 100 gram portion of the bis(maleate half ester) of diethylene glycol prepared above was added an amount of catalyst also specified for each example in Table A. The resulting reaction mixture was maintained at this temperature for a period of time specified for each example in Table A with continuous stirring. Samples were removed at time periods specified for each example in Table A and analyzed to determine the extent of isomerization by NMR spectroscopic analysis. The extent of isomerization is shown in Table A as the mole percent of unsaturation present in the sample as fumarates, mainly bis(fumarate half esters) of diethylene glycol. The remainder of the sample included maleates, mainly bis(maleate half esters) of diethylene glycol, and maleic anhydride.

TABLE A

| Example | Catalyst (wt. %) | Temperature (°C.) | Time (hr.) | Isomerization (%) |
|---|---|---|---|---|
| 5 | Concentrated Hydrochloric Acid (1.2) | 100 | 0.5 | 61 |
|   |   | 100 | 0.5 |   |
|   |   | 120 | 4 | 74 |
| 6 | Concentrated Hydrochloric Acid (1.2) | 120 | 4.1 | 93 |
| 7 | Aluminum Chloride (1.0) | 100 | 2.1 | 77 |
| 8 | Phosphorous Trichloride (1.0) | 120 | 1.0 | 76 |

Examples 9 through 12 and Comparative Examples A through D show the effect of choice of catalyst and amount thereof on the reaction of a fumarate half ester, i.e., ethyl hydrogen fumarate, with dicyclopentadiene.

EXAMPLES 9 THROUGH 12 AND COMPARATIVE EXAMPLES A THROUGH D

Into a 25 mm×200 mm test tube having a magnetic stirring bar and sealed with a serum cap was added 10.0 grams (0.069 moles) of ethyl hydrogen fumarate (commercially available from the Aldrich Chemical Company, Milwaukee, Wis.), and 9.16 grams (0.069 moles) of high purity dicyclopentadiene. After heating the reaction mixture to a temperature of 120° C. with continuous stirring, an amount of a catalyst specified for each example in Table B was added into the test tube. The resulting reaction mixture was maintained at a temperature of 120° C. for a period of time specified for each example in Table B. Samples were removed at time periods specified for each example in Table B and analyzed to determine the acid number thereof. The acid number is indicative of the extent of the reaction between ethyl hydrogen fumarate and dicyclopentadiene. The extent of the reaction is shown in Table B as the percent decrease in acid number based on the acid number of Comparative Example A. Although equimolar amounts of the ethyl hydrogen fumarate and dicyclopentadiene were used, the acidity did not reach zero when all of the dicyclopentadiene had reacted since side reactions consumed a portion of the dicyclopentadiene.

TABLE B

| Example/ Comparative Example | Catalyst (wt. %) | Time (hr.) | Acid Number (mg KOH/gm) | % Decrease in Acid Number |
|---|---|---|---|---|
| 9 | Fluoroboric Acid[a] (0.5) | 1.0 | 44 | 79 |
|   |   | 2.0 | 45 | 78 |
|   |   | 3.0 | 44 | 79 |
| 10 | Fluoroboric Acid[a] (0.1) | 1.0 | 161 | 23 |
|   |   | 3.0 | 93 | 55 |

TABLE B-continued

| Example/ Comparative Example | Catalyst (wt. %) | Time (hr.) | Acid Number (mg KOH/gm) | % Decrease in Acid Number |
|---|---|---|---|---|
| | | 5.0 | 74 | 64 |
| 11 | HPF$_6$[b] (0.5) | 1.0 | 92 | 56 |
| | | 2.0 | 65 | 69 |
| | | 4.0 | 50 | 76 |
| 12 | Triflic Acid[e] (0.05) | 0.25 | 62 | 70 |
| | | 0.75 | 60 | 71 |
| | | 2.0 | 58 | 72 |
| A | None | 0 | 209 | 0 |
| | | 2.0 | 208 | 0.5 |
| | | 9.5 | 202 | 3 |
| B | Sulfuric Acid (0.5) | 1.0 | 177 | 15 |
| C | Concentrated Hydrochloric Acid[c] (0.5) | 1.0 | 209 | 0 |
| D | CH$_3$SO$_3$H[d] (0.5) | 1.0 | 192 | 8 |

[a] A 48 weight percent solution in water.
[b] A 60 weight percent solution in water.
[c] A 37 weight percent solution in water.
[d] A 70 weight percent solution in water.
[e] Trifluoromethanesulfonic acid.

EXAMPLE 13

Into a 25 mm×200 mm test tube having a magnetic stirring bar and sealed with a serum cap was added 5.72 grams (0.0397 moles) of ethyl hydrogen fumarate (commercially available from the Aldrich Chemical Company, Milwaukee, Wis.) and 3.63 grams (0.0394 moles) of bicyclo[2.2.1]hepta-2,5-diene (commercially available from the Aldrich Chemical Company, Milwaukee, Wis.), also known as norbornadiene. After heating the reaction mixture to a temperature of 120° C. with continuous stirring, 32 milliliters (0.5 weight percent) of fluoroboric acid (a 48 weight percent solution in water) were added into the test tube. The resulting reaction mixture was maintained at a temperature of 120° C. for a period of one hour with continuous stirring. The extent of the reaction between ethyl hydrogen fumarate and bicyclo[2.2.1]hepta-2,5-diene was monitored during this period by titration for residual acid. A sample was removed from the test tube after the one hour reaction period and analyzed to determine the acid number thereof. Based on the initial acid number of the reaction mixture, an 86 percent decrease in acid number was observed after the one hour reaction period.

EXAMPLE 14

Into a 25 mm×200 mm test tube having a magnetic stirring bar and sealed with a serum cap was added 5.0 grams (0.0347 moles) of ethyl hydrogen fumarate (commercially available from the Aldrich Chemical Company, Milwaukee, Wis.) and 3.74 grams (0.40 moles) of bicyclo[2.2.1]-2-heptene (commercially available from the Aldrich Chemical Company, Milwaukee, Wis.), also known as norbornene. After heating the reaction mixture to a temperature of 120° C. with continuous stirring, 32 milliliters (0.5 weight percent) of fluoroboric acid (a 48 weight percent solution in water) were added into the test tube. The resulting reaction mixture was maintained at a temperature of 120° C. for a period of 3 hours with continuous stirring. The extent of the reaction between ethyl hydrogen fumarate and bicyclo[2.2.1]-2-heptene was monitored during this period by titration for residual acid. A sample was removed from the test tube after the 3 hour reaction period and analyzed to determine the acid number thereof. Based on the initial acid number of the reaction mixture, a 68 percent decrease in acid number was observed after the 3 hour reaction period.

Examples 15 through 21 describe SPI gel time experiments using the procedure described by A. L. Smith (6th SPI, Chicago, Ill., 1951, Reinforced Plastics Div., Section 1, page 1).

EXAMPLES 15 THROUGH 18

Into a small glass jar was added 20 grams of a resin specified for each example in Table C and 1 phr of benzoyl peroxide initiator. The resulting mixture was stirred for 5 minutes and then poured into a 19 mm×150 mm test tube to a depth of 3 inches. A thermocouple was placed into the center of the mixture, and the test tube was then immersed in an oil bath at 82.3° C. The cure speed for each resin is reflected by the gel time and by the total time to peak temperature. The gel time is the time required for the temperature of the mixture to rise from 65.5° C. to 87.8° C. The total time is the time required for the temperature of the mixture to rise from 65.5° C. to the peak temperature. The peak temperature is the maximum temperature achieved during cure. The gel time, total time and peak temperature are given for each of the examples in Table C. The styrene content of each resin is also given in Table C. The cured plug obtained from each of the examples was hard and clear.

TABLE C

| Example | 15 | 16 | 17 | 18 |
|---|---|---|---|---|
| Resin Prepared from Example # | 1 | 2 | 3 | 4 |
| Styrene Content of Resin (wt. %) | 40 | 35 | 35 | 45 |
| Gel Time (min.) | 6.4 | 8.2 | 9.1 | 12.0 |
| Total Time (min.) | 10.4 | 12.4 | 12.6 | 17.1 |
| Peak Temperature (°C.) | 198 | 200 | 199 | 178 |

EXAMPLES 19 THROUGH 21

Into a 100 milliliter Erlenmeyer flask equipped with a magnetic stirrer was added 30 grams of a resin specified for each example in Table D and an amount of a weak base also specified for each example in Table D. The resulting mixture was stirred for a period of one hour at ambient temperature, after which the resin was recovered by filtration.

Into a small glass jar was added 20 grams of the weak base treated resin prepared above and 1 phr of benzoyl peroxide initiator. The resulting mixture was stirred for 5 minutes and then poured into a 19 mm×150 mm test tube to a depth of 3 inches. A thermocouple was placed into the center of the mixture, and the test tube was then immersed in an oil bath at 82.3° C. The cure speed for each of the resins is reflected by the gel time and by the total time to peak temperature as described above. The gel time, total time and peak temperature are given for each of the examples in Table D. The cured plug obtained from each of the examples was hard and clear.

TABLE D

| Example | 19 | 20 | 21 |
|---|---|---|---|
| Resin Prepared from Example # | 3 | 3 | 4 |
| Weak Base (wt %)[a] | Na$_2$CO$_3$[b](0.4) | Na$_2$HPO$_4$(1.0) | Polyvinylpyridine[c] (5.0) |
| Gel Time (min.) | 9.3 | 9.2 | 11.9 |

TABLE D-continued

| Example | 19 | 20 | 21 |
|---|---|---|---|
| Total Time (min.) | 12.9 | 12.9 | 16.2 |
| Peak Temperature (°C.) | 212 | 213 | 189 |

(a)Based on resin.
(b)0.4 wt. % of MgSO4 included as a desiccant.
(c)Commercially available from Reilly Tar and Chemical, Indianapolis, Indiana as R-8050.

Examples 22 through 25 describe the preparation of unreinforced castings from the resin compositions of this invention.

EXAMPLES 22 THROUGH 25

Into an 8 inch × 8 inch × ⅛ inch glass mold was poured a thermosetting resin mixture containing 140 grams of a resin specified for each example in Table E, 0.7 grams of Zelec UN mold release agent (an organophosphate mold release commercially available from E. I. duPont de Nemours, Wilmington, Del.), and 1.4 grams of t-butyl perbenzoate initiator. The thermosetting resin mixture was then heated using a programmed temperature cycle, i.e., 16 hours at 65° C., 3 hours at 85° C. and 4 hours at 125° C. The castings obtained from each of the examples were hard and clear. The castings were tested for certain properties identified in Table E. The results are given in Table E.

TABLE E

| Example | 22 | 23 | 24 | 25 |
|---|---|---|---|---|
| Resin Prepared from Example # | 1 | 2 | 3(a) | 4 |
| Casting Properties | | | | |
| Flexural Strength (10³ psi) | 11.6 | 13.1 | 7.9 | 8.5 |
| Flexural Modulus (10⁵ psi) | 4.6 | 4.7 | 5.0 | 5.3 |
| Heat Deflection Temperature (°C.) | 115 | 127 | 144 | 109 |

(a)The resin was treated with 0.4 weight percent Na2CO3 and 0.4 weight percent MgSO4. Also, the resin was initiated with 1.5 phr of t-butyl perbenzoate.

Examples 26 through 28 describe the preparation of fiber reinforced composites from the resin compositions of this invention.

EXAMPLES 26 THROUGH 28

Into a 10 inch × 5½ inch × 1/10 inch constant volume mold preheated to 140° C. was injected a thermosetting resin mixture containing an amount of a resin, an amount of Zelec UN mold release agent, and an amount of t-butyl perbenzoate initiator. The proportions of each component are shown in Table F. Approximately 85 grams (5 plies) of AKM random glass mat commercially available from PPG Industries, Inc., Pittsburgh, Pa., was placed in the 10 inch × 5½ inch × 1/10 inch constant volume mold prior to injection. The mold was then closed and evacuated for about 5 seconds prior to injection of the particular resin mixture. The injection time for each of the examples is specified in Table F. An injection pressure of 250 pounds per square inch was maintained for a dwell period of 5 seconds for each example. The resin penetrated the glass web and wet the fibers before it formed a thermoset composition. Following the cure time specified for each example in Table F, the resulting cured glass reinforced composites were removed from the mold and tested. The results of such testing are given in Table F.

TABLE F

| Example | 26 | 27 | 28 |
|---|---|---|---|
| Resin Mixture Composition | | | |
| Resin Prepared from Example # | 1 | 2 | 3(a) |
| Resin (gms) | 1400 | 800 | 600 |
| Zelec UN Mold Release (gms) | 7.0 | 4.0 | 3.0 |
| t-Butyl Perbenzoate (gms) | 21.0 | 12.0 | 9.0 |
| Molding Conditions | | | |
| Injection Time (sec.) | 7 | 4 | 5 |
| Cure Time (sec.) | 105 | 150 | 160 |
| Total Mold Closed Time(b) (sec.) | 122 | 164 | 170 |
| Composite Properties | | | |
| Tensile Strength (10³ psi) | 27.1 | 27.6 | 22.7 |
| Tensile Moldulus (10⁶ psi) | 1.48 | 1.52 | 1.52 |
| Elongation (%) | 2.2 | 2.1 | 1.7 |
| Flexural Strength (10³ psi) | 31.5 | 33.7 | 38.2 |
| Flexural Modulus (10⁶ psi) | 1.52 | 1.61 | 1.72 |
| Glass Content (wt. %) | 58 | 54 | 49 |

(a)The resin was treated with 0.4 weight percent Na2CO3 and 0.4 weight percent MgSO4 prior to mixing.
(b)The total mold closed time includes the sum of the evacuation time (5 seconds for each example), the injection time, the dwell time (5 seconds for each example) and the cure time.

As illustrated by Examples 26 through 28, fiber reinforced thermoset resin articles having high stiffness and strength can be produced from the low viscosity curable resin compositions of this invention by a rapid injection molding process. The flexural properties of the composite prepared in Example 28 are particularly significant in view of the low glass content in the composite.

COMPARATIVE EXAMPLE A

Into a 3 liter four-necked round bottom reaction flask equipped with a nitrogen inlet and outlet, paddle stirrer, electric heating mantle and a thermometer with Therm-O-Watch controller was added 522 grams (5.33 moles) of molten maleic anhydride. The maleic anhydride was heated to a temperature of 100° C. with continuous stirring, and maintained at that temperature for a period of 10 minutes. Throughout the 10 minute period, 800 grams (5.33 moles) of dicyclopentenyl alcohol (commercially available from Velsicol Chemical Company, Chicago, Ill.) was slowly added to the reaction flask with continuous stirring. The resulting reaction mixture was then heated to a temperature of 140° C. and maintained at that temperature for a period of 5 hours. A nitrogen blanket was maintained throughout this reaction period. The extent of the reaction between dicyclopentenyl alcohol and maleic anhydride was monitored by titration for residual acid, and also by NMR spectroscopy. NMR spectroscopic analysis indicated that the reaction mixture consisted predominantly of dicyclopentenyl maleate half ester. The reaction mixture had an acid number of 206 mg KOH/gm in pyridine/methanol, indicating that the major maleate species was the dicyclopentenyl maleate half ester.

Into a flask equipped with a 12 inch vacuum jacketed Vigreux column connected to a Barrett trap and water cooled condenser was added a 1298 gram portion of the reaction mixture prepared above. The reaction mixture (waxy material) was heated to a temperature of 150° C. after which 277 grams (2.62 moles) of diethylene glycol, 48 grams of mixed xylenes and 0.16 grams of methylhydroquinone were added to the flask. The resulting reaction mixture was then heated to a temperature of 210° C. over a 4 hour period as water collected in the Barrett trap. The mixed xylenes were recycled to aid in water removal. The reaction mixture was maintained at a temperature of from 207° C.–210° C. for a period of 7 hours, cooled to a temperature of 170° C. and subjected to a vacuum of 28 inches of mercury for 1.5 hours to remove residual volatiles.

Following the 1.5 hour vacuum period, the residue was cooled to a temperature of 105° C. and blended with 640 grams of styrene containing 0.17 grams of methylhydroquinone. The resulting liquid product had a viscosity of 342 centipoises at 25° C. and an acid number of 16 mg KOH/gm in pyridine/methanol. A gel permeation chromatogram of the dicyclopentadiene modified polyester in this resin is shown in FIG. 1.

FIG. 1 shows that the dicyclopentadiene modified polyesters of this invention as illustrated by Example 3 have a significantly narrower molecular weight distribution than comparative dicyclopentadiene modified polyesters of the prior art as illustrated by this comparative example.

I claim:

1. A process for preparing a resin composition comprising the steps of:

(a) contacting maleic acid or anhydride with an organic polyol for a time and at a temperature sufficient to form a composition comprising a maleate ester having the formula:

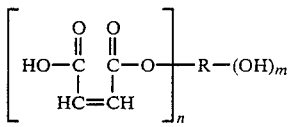

wherein n is a number having an average value of about 2 to less than about 4, m is a number equal to the free valence of R less the average value of n, the ratio of n to m is greater than about 2.0, and R is the hydroxyl-free residue of an organic polyol which contained from 2 to 4 inclusive hydroxyl groups;

(b) heating the maleate ester of (a) in the presence of a catalyst for a time and at a temperature sufficient to form a composition comprising a fumarate ester having the formula:

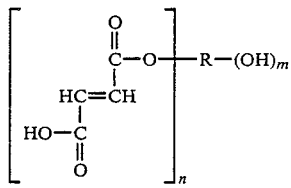

wherein n, m and R are as defined above;

(c) contacting a Diels-Alder adduct of cyclopentadiene with an olefinic or acetylenic hydrocarbon or alkylated derivative thereof with about stoichiometric amounts of carboxyl groups of the fumarate ester of (b) in the presence of a non-oxidizing acid catalyst having a non-nucleophilic anion for a time and at a temperature sufficient to form a composition comprising an unsaturated ester having the formula:

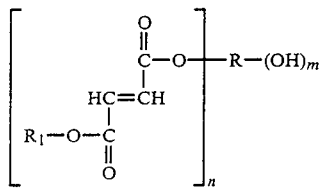

wherein n, m and R are as defined above and $R_1$ is the residuum of a Diels-Alder adduct of cyclopentadiene with an olefinic or acetylenic hydrocarbon or alkylated derivative thereof having from 2 to about 20 carbon atoms; and (d) admixing a copolymerizable ethylenically unsaturated monomer with the unsaturated ester of (c).

2. A process as defined in claim 1 wherein the organic polyol in step (a) is selected from ethylene glycol, diethylene glycol, propylene glycol, trimethylol propane, polycaprolactone esters of trimethylol propane, 2,2-bis(4-hydroxyphenyl)propane, and the ethylene and propylene oxide adducts of 2,2-bis(4-hydroxyphenyl)-propane.

3. A process as defined in claim 1 wherein step (a) is carried out at a temperature of from 60° C. to 120° C.

4. A process as defined in claim 1 wherein the maleate ester of formula (I), the fumarate ester of formula (II) and the unsaturated ester of formula (III) have a ratio of n to m of at least about 3.0.

5. A process as defined in claim 1 wherein step (b) is carried out at a temperature of from 80° C. to 150° C.

6. A process as defined in claim 1 wherein the Diels-Alder adduct of cyclopentadiene with an olefinic or acetylenic hydrocarbon or alkylated derivative thereof in step (c) is selected from dicyclopentadiene, methyl dicyclopentadiene, norbornene and norbornadiene.

7. A process as defined in claim 1 wherein the Diels-Alder adduct of cyclopentadiene with an olefinic or acetylenic hydrocarbon or alkylated derivative thereof in step (c) is dicyclopentadiene.

8. A process as defined in claim 1 wherein the non-oxidizing acid catalyst having a non-nucleophilic anion in step (c) is selected from fluoroboric acid, hexafluorophosphoric acid, hexafluoroantimonic acid and trifluoromethanesulfonic acid (triflic acid).

9. A process as defined in claim 1 wherein the non-oxidizing acid catalyst having a non-nucleophilic anion in step (c) is fluoroboric acid.

10. A process as defined in claim 1 wherein the non-oxidizing acid catalyst having a non-nucleophilic anion in step (c) is present in an amount of from 0.01 weight percent to 4.0 weight percent based on the weight of the fumarate ester of step (b).

11. A process as defined in claim 1 wherein step (c) is carried out at a temperature of from 80° C. to 140° C.

12. A process as defined in claim 1 wherein the copolymerizable ethylenically unsaturated monomer in step (d) is styrene.

13. A process as defined in claim 1 wherein the copolymerizable ethylenically unsaturated monomer in step (d) is a mixture of styrene and 2-hydroxyethyl methacrylate.

14. A process as defined in claim 1 wherein the copolymerizable ethylenically unsaturated monomer in step (d) is present in an amount of from 10 weight percent to 75 weight percent based on the weight of the resin composition.

15. A process as defined in claim 1 further comprising treating the resin composition with a weak base.

16. A process as defined in claim 15 wherein the weak base is selected from crosslinked polyvinylpyridine, disodium acid phosphate, sodium carbonate and alumina.

17. A resin composition prepared according to the process of claim 1.

18. A cured molded article prepared from the composition of claim 17.

* * * * *